United States Patent

[11] 3,604,463

[72] Inventor  Jack Lowrie McLarty
              Milwaukee, Wis.
[21] Appl. No. 845,880
[22] Filed     July 29, 1969
[45] Patented  Sept. 14, 1971
[73] Assignee  Universal Oil Products Company
               Des Plaines, Ill.

[54] WEAR-RESISTANT TUBE
     6 Claims, 1 Drawing Fig.
[52] U.S. Cl. .................................................. 138/144,
                                138/153, 138/DIG.2, 138/178
[51] Int. Cl. .................................................... F16l 9/12
[50] Field of Search ........................................ 138/140-153,
                                                    177, 178, DIG.2

[56] References Cited
     UNITED STATES PATENTS
2,847,786  8/1958  Hartley et al. ................. 138/DIG.2
2,877,150  3/1959  Wilson ......................... 138/144
3,071,162  1/1963  Mick ........................... 138/DIG.2

Primary Examiner—Houston S. Bell, Jr.
Attorneys—James R. Hoatson, Jr. and Philip T. Liggett ABSTRACT: A wear-resistant tube and the method of manufacture thereof. A tube is produced having an interior gel coat layer containing a first thermosetting resin system within which particles of mica are dispersed. Fiberglass filaments coated within a second thermosetting resin system are overwound about this interior layer to form an exterior layer. The interior and exterior layers are bounded to each other and together form a wear-resistant tube.

PATENTED SEP 14 1971
3,604,463
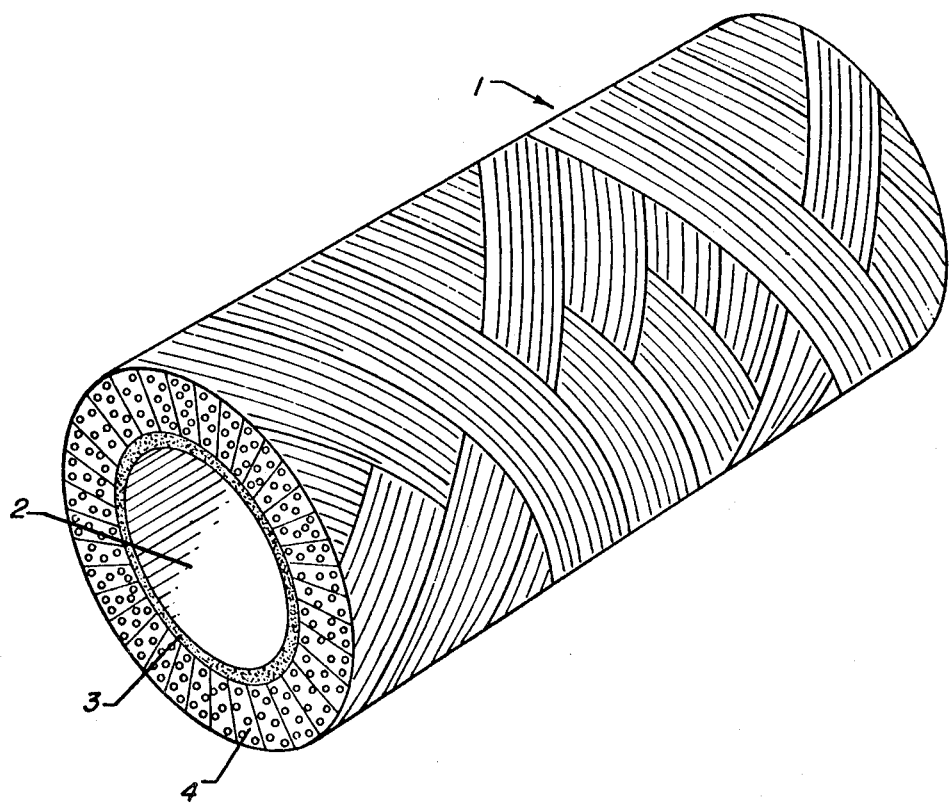
INVENTOR:
Jack Lowrie McLarty
BY: James R. Hoalson, Jr.
Philip J. Liggett
ATTORNEYS

WEAR-RESISTANT TUBE

This invention relates to a wear-resistant tube and the method of manufacture thereof. The tube is produced having an interior gel coat layer containing a first thermosetting resin system within which particles of mica are dispersed. Fiberglass filaments coated with a second thermosetting resin system are overwound about this interior layer to form an exterior layer. The interior and exterior layers are held together by the resin bonds and together form the wear-resistant tube of this invention.

Wear-resistant tubes, sometimes called self-lubricating tubes, are currently widely used in industry as pneumatic cylinders, hydraulic cylinders, and in other piston-cylinder applications. Tubes constructed of fiberglass filaments which are set in a thermosetting resin and which surround and reinforce an inner gel coat layer containing a dry lubricant, effectively form a superior product for such purposes. Predominant among the conventional dry lubricants used in such tubes are molybdenum disulfide and graphite. Particles of these substances, when dispersed in an interior gel coat layer of a filament wound tube, provide a smooth wear-resistant surface which will withstand the repeated passage of a piston for more than a million cycles. To a less significant extent, tungsten disulfide, tungsten diselenide, selenium disulfide, molybdenum diselenide, and various other dry materials have been used as solid lubricants in an interior gel coat layer in a pneumatic or hydraulic cylinder.

Particles of mica have never been used as a dry lubricant in an interior gel coat layer in a wear-resistant tube, however. The initial use of mica for this purpose is the subject of this invention and is described herein. The points of novelty of this invention reside in the incorporation of mica as a solid lubricant in the manufacture of the wear-resistant tubes described, and in the combination of mica and an otherwise conventional tube of the type described.

An interior tube surface in which particles of mica are dispersed shows less wear after prolonged use than do surfaces in which particles of conventional dry lubricants are dispersed. At the same time, tubes containing mica particles in their interior surface layers are sufficiently self-lubricating to withstand prolonged use equivalent to that available in tubes utilizing conventional dry lubricants. In addition, the cost of mica is only a fraction of the cost of conventional dry lubricants.

It is a primary object of this invention to produce a self-lubricating tube which wears less and retains its dimensional tolerance longer than conventional self-lubricating filament wound tubes. There is less removal of material from the interior surface of the tube through wear in tubes manufactured according to this invention as compared with conventional wear-resistant tubes.

Another object of this invention is to produce a tube which costs substantially less than conventional filament wound tubes. This is possible due to the lower cost of mica as a dry lubricant as compared with other dry lubricants in conventional tubes. For example, the cost of mica is less than one-tenth the cost of molybdenum disulfide, currently the most popular dry lubricant used for this purpose.

The invention is further described in the accompanying drawing which illustrates one embodiment of the tube of this invention.

In one aspect this invention is a tube 1 having a wear resistant inner surface 2 comprising an interior gel coat layer 3 of a first thermosetting resin system in which finely ground mica particles are dispersed, and an exterior layer 4 of fiberglass filaments coated by and bonded together with a second thermosetting resin system and overwound about and bonded to said interior layer.

Preferably, the first thermosetting resin system used in the gel coat layer is a polyester resin with a hardening agent. Alternatively, the first thermosetting resin system used in the gel coat layer may be an epoxy resin and a hardening agent. Similarly, the second thermosetting resin system used in the exterior layer may be either an epoxy resin and a hardening agent or a polyester resin and a hardening agent. A composite tube in which the first thermosetting resin system is a polyester resin and a hardening agent and the second thermosetting resin system is an epoxy resin and a hardening agent is both highly wear-resistant and structurally sound.

In a thermosetting resin system utilizing an epoxy resin, the epoxy resin is normally a conventional epoxy resin derived from epochlorohydrin and bis-phenol A, but may be any type of epoxy resin. The hardening agent in such a resin system may be any of the conventional hardeners, which include primary aliphatic polyamines, modified primary aliphatic polyamines, cyclic aliphatic amines, aromatic amines, tertiary amines, latent curing agents, polyamides, and acid anhydrides. These components are commonly used in conventional ways to create epoxy resin systems. A polyester resin used in either of the thermosetting resin systems is normally derived from the reaction of dicarboxylic acid with a dihydric alcohol. To the polyester resin is added a hardening agent, which is normally a reactive monomer. Styrene is the most widely used reactive monomer, though other monomers sometimes used include diallyl phthalate, diallyl isophthalate, and triallyl cyanurate. Peroxide catalysts are generally used in the final copolymerization reaction. Resin systems utilizing these components are also commonly used. Pigments may be incorporated into all resin systems using the above components to impart the desired colors to the interior and exterior layers of a tube.

In another aspect, this invention is a method of making a tube having a wear-resistant inner surface comprising: preheating a mandrel to a temperature of at least about 200° F.; coating said mandrel at a temperature of at least about 200° F. with a gel coat material comprised of particles of finely ground mica dispersed in a first thermosetting resin system; curing said gel coat material, thereby forming an interior layer; passing fiberglass filaments through a second thermosetting resin system, thereby forming a coating on said fiberglass filaments; overwinding said coated fiberglass filaments about said interior layer; and curing said fiberglass filaments, thereby bonding said fiberglass filaments together and forming an exterior layer bonded to said interior layer.

As can be seen, the methods of manufacture of conventional wear-resistant tubes having an interior gel coat layer and an exterior filament wound layer are applicable to the manufacture of the tube of this invention. The point of novelty resides in the incorporation of mica as the solid lubricant into the interior surface of the tube.

Mica is a term referring to a number of silicates, each of which contains a hydroxyl, an aluminum silicate group, and an alkali. Mica occurs naturally as a mineral in igneous and metamorphic rocks. For use in this invention, mica in any form is ground into a fine powder either in the present or absence of water. When mica is ground in the presence of water it is referred to as "water ground." The process of grinding mica in the absence of water is referred to as "dry grinding." The term mica includes especially muscovite, but also phlogopite, lepidolite, vermiculite, and synthetic mica as well. For use in this invention, the mica is ground into particles of from about 5 to about 30 microns in particle size. Preferably, the particles average about 10 microns in particle size.

While the quantity of mica as a percentage of the total gel coat material may vary greatly, from 1 percent to 30 percent or even greater, the preferred proportion is about 10 percent mica.

The following examples further illustrate the manner in which the wear-resistant tube of this invention may be produced.

EXAMPLE 1

A mandrel, such as is commonly used in the art of filament winding, is cleaned with a solvent such as one containing toluene. This is done by wiping down the mandrel with a cotton cloth soaked in the solvent with special attention given to removing residual deposits or bits of resin from previous winding operations. Thereafter, the mandrel is heated to a temperature of at least 425° F., preferably to about 440° F., for at least about 4 hours. The time of heating should be extended for mandrels greater than 3 inches in diameter. That is, a mandrel of 8-inch diameter should be heated for 6 hours and a mandrel of 16-inch diameter should be heated for 8 hours. After heating, the mandrel is removed from the oven and is allowed to cool to room temperature. After the cleaning operation, the mandrel is coated with a release agent, such as a silicone paste wax. The excess paste wax is buffed off and the mandrel is ready for the preheating step.

The mandrel is preheated in an oven to a temperature of at least about 200° F., preferably about 225° F. Heating is continued until the mandrel reaches the oven temperature. Thereafter, the mandrel is removed from the oven and coated at a temperature of at least about 200° F., but preferably no greater than 225° F., with a gel coat material comprised of particles of finely ground mica dispersed in a first thermosetting resin system. The coating operation is normally accomplished by spraying the gel coat material onto the mandrel until a gel coat 5 to 10 mils in thickness is formed on the mandrel. Preferably, the first resin system is a conventional polyester resin system comprised of a polyester resin and a hardening agent, such as styrene. A quantity of black pigment for coloring is added to the resin system. The dispersed particles of mica comprise about 10 percent of the gel coat material by weight and the black pigment amounts to about 3 percent by weight. The balance of the gel coat material is comprised of the polyester resin system. After coating the mandrel, the gel coat material should be cured, thereby forming an interior layer. If the aforesaid polyester-styrene resin system is used, the gel coat should be allowed to cure at room temperature for at least about 45 minutes prior to overwinding fiberglass filaments about the interior layer formed.

After the gel coat is cured, it is often helpful to sand the gel coat lightly with light sandpaper. Fiberglass filaments are then passed through a resin bath containing a second thermosetting resin system which forms a coating on the fiberglass filaments. This second resin system is preferably a conventional epoxy resin system comprised of an epoxy resin and a hardening agent, such as diethylene triamine, or any other conventional epoxy hardening agent. To the epoxy resin system is added black pigment for coloring to the extent of about 1 percent of the resin system by weight. A conventional filament winding machine is used to overwind the coated fiberglass filaments about the interior gel coat layer on the mandrel. When several filament thicknesses have been overwound about the gel coat layer on the mandrel, filament winding is discontinued and curing of the second thermosetting resin system is begun. The aforesaid coating of the second resin system on the fiberglass filaments is cured by being heated for about 4 hours at a temperature of about 212° F. The second thermosetting resin system coating on the fiberglass filaments thereby bonds the fiberglass filaments together and forms an exterior layer bonded to the interior layer by resin bonds. The interior and exterior layers together form the objects of this invention which is a tube having a wear-resistant inner surface. The composition and characteristics of this tube have been described previously.

While not vital to the invention, a preferred product results when the tube produced is post cured for about 4 hours in an oven at a temperature of about 300° F. At the end of the 4 hours, the tube is cooled slowly to room temperature over a period of an additional hour. The tube is then ready for use.

EXAMPLE 2

The method of example 1 is repeated but with the substitution of an epoxy resin and triethylene tetramine as the first thermosetting resin system in place of the polyester resin and styrene used in example 1.

EXAMPLE 3

The method of example 1 is repeated with the substitution of a polyester resin and styrene for the epoxy resin and diethylene triamine of example 1.

The foregoing detailed examples of the preferred ways of carrying out the method of this invention and producing the object of this invention have been set forth for the purpose of providing clarity and understanding only. No unnecessary limitations should be construed from the foregoing as other modifications will be obvious to those skilled in the art of producing wear-resistant tubes comprised of an interior gel coat layer in which is dispersed a dry lubricant, and an exterior layer of reinforcing fiberglass filaments.

I claim as my invention:

1. A cylindrical concentrically layered tube having a wear-resistant inner surface comprising a cylindrical interior gel coat layer having radial inner and outer surfaces and comprised of a first thermosetting resin system and finely ground mica particles dispersed throughout said first resin system which acts as a dry lubricant at said inner surface of said gel coat layer, and a cylindrical outer layer having inner and outer surfaces and formed from glass filaments impregnated with a second thermosetting resin system and positioned in a reversing helical pattern about said interior gel coat layer, and said outer layer has a radial depth equal to the thickness of several of said filaments and is coextensive with said interior layer, and said inner surface of said outer layer is bonded throughout to said outer surface of said inner layer.

2. The tube of claim 1 further characterized in that said first thermosetting resin system used in said gel coat layer is a polyester resin with a hardening agent.

3. The tube of claim 1 further characterized in that said first thermosetting resin system used in said gel coat layer is an epoxy resin and a hardening agent.

4. The tube of claim 1 further characterized in that said second thermosetting resin system used in said exterior layer is an epoxy resin and a hardening agent.

5. The tube of claim 1 further characterized in that said second thermosetting resin system used in said exterior layer is polyester resin and a hardening agent.

6. The tube of claim 1 further characterized in that said mica particles are water ground particles having a particle size of from about 5 to about 30 microns, and comprise about 10 percent of said gel coat layer by weight.